US006594950B2

(12) United States Patent
Johnson

(10) Patent No.: US 6,594,950 B2
(45) Date of Patent: *Jul. 22, 2003

(54) METHOD AND APPARATUS FOR APPLYING A GROWTH REGULATING COMPOSITION TO A COTTON CROP

(76) Inventor: Louie H. Johnson, 5807 Hwy. 11 N., Grifton, NC (US) 28503

( * ) Notice: Subject to any disclaimer, the term of this patent is extended or adjusted under 35 U.S.C. 154(b) by 0 days.

This patent is subject to a terminal disclaimer.

(21) Appl. No.: 09/951,009

(22) Filed: Sep. 11, 2001

(65) Prior Publication Data

US 2002/0108300 A1 Aug. 15, 2002

Related U.S. Application Data

(63) Continuation of application No. 08/772,480, filed on Dec. 23, 1996, now Pat. No. 6,286,250.

(51) Int. Cl.[7] .................................................. A01G 7/00
(52) U.S. Cl. ..................................... 47/1.5; 47/1.7; 47/5
(58) Field of Search ................................. 47/1.5, 1.7, 5

(56) References Cited

U.S. PATENT DOCUMENTS

| 5,297,358 A | * | 3/1994 | Van Steen ..................... 47/1.5 |
| 5,705,648 A | * | 1/1998 | Clark et al. ................. 424/408 |
| 5,720,127 A | * | 2/1998 | Robertson .................... 239/166 |
| 6,286,250 B1 | * | 9/2001 | Johnson ........................ 47/1.5 |

* cited by examiner

*Primary Examiner*—J. Woodrow Eldred
(74) *Attorney, Agent, or Firm*—Coats & Bennett, P.L.L.C.

(57) ABSTRACT

A wick applicator for applying agricultural liquid chemicals to crops, weeds and other vegetation. The wick applicator includes an elongated tube for holding and dispensing liquid chemicals. An air inlet extends from the tube and is communicatively open to the internal chamber of the tube. To meter or regulate the flow of liquid chemicals from the elongated tube, a non-variable fixed size orifice is disposed in the air inlet tube. In use, the wick applicator is useful in applying a growth regulating composition to the upper portion of a cotton crop. This is achieved by setting the wick applicator at a selected height and then moving it through a cotton field at that height and in the process, engaging and mopping the portion of any cotton crop in its path.

7 Claims, 4 Drawing Sheets

Figure 1:
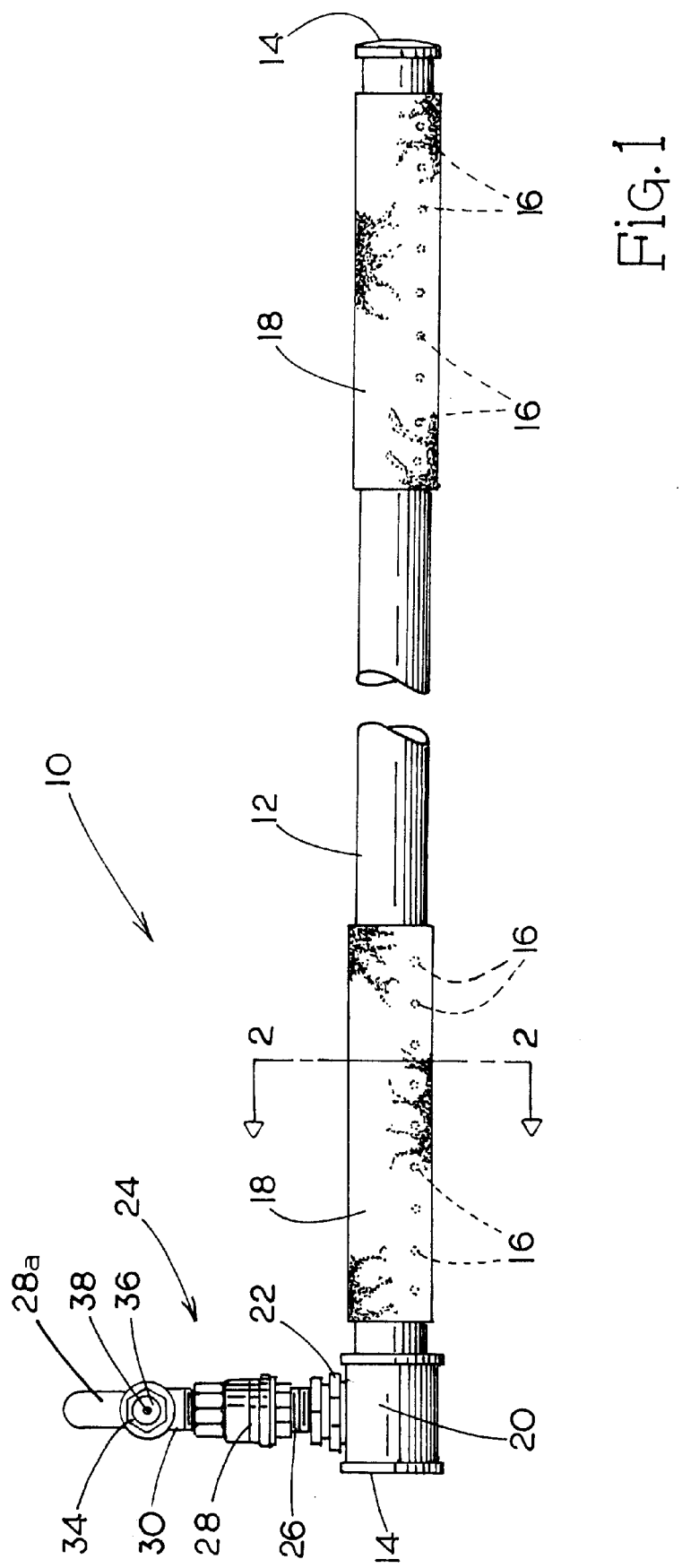
Figure 2:
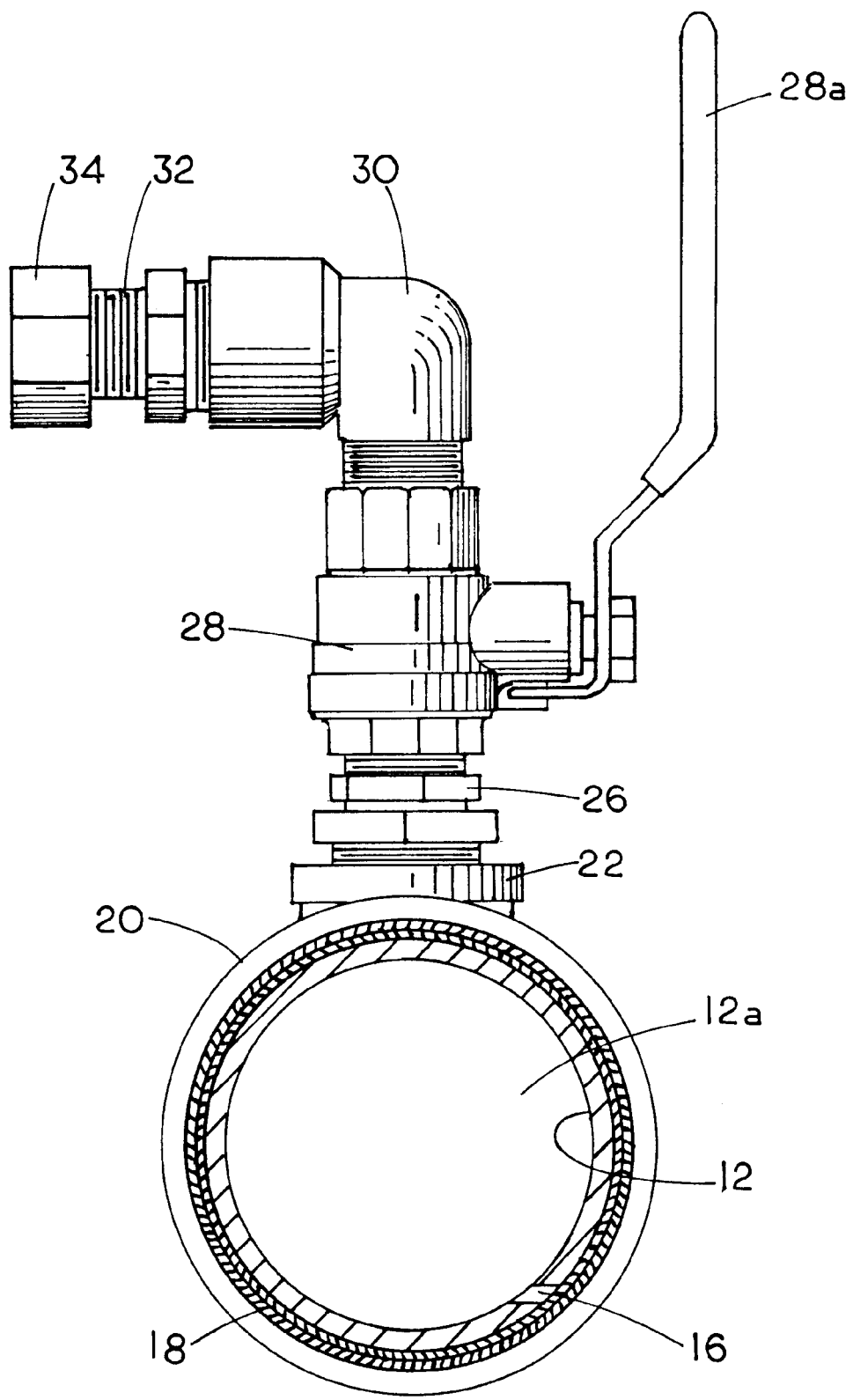
Figure 3:
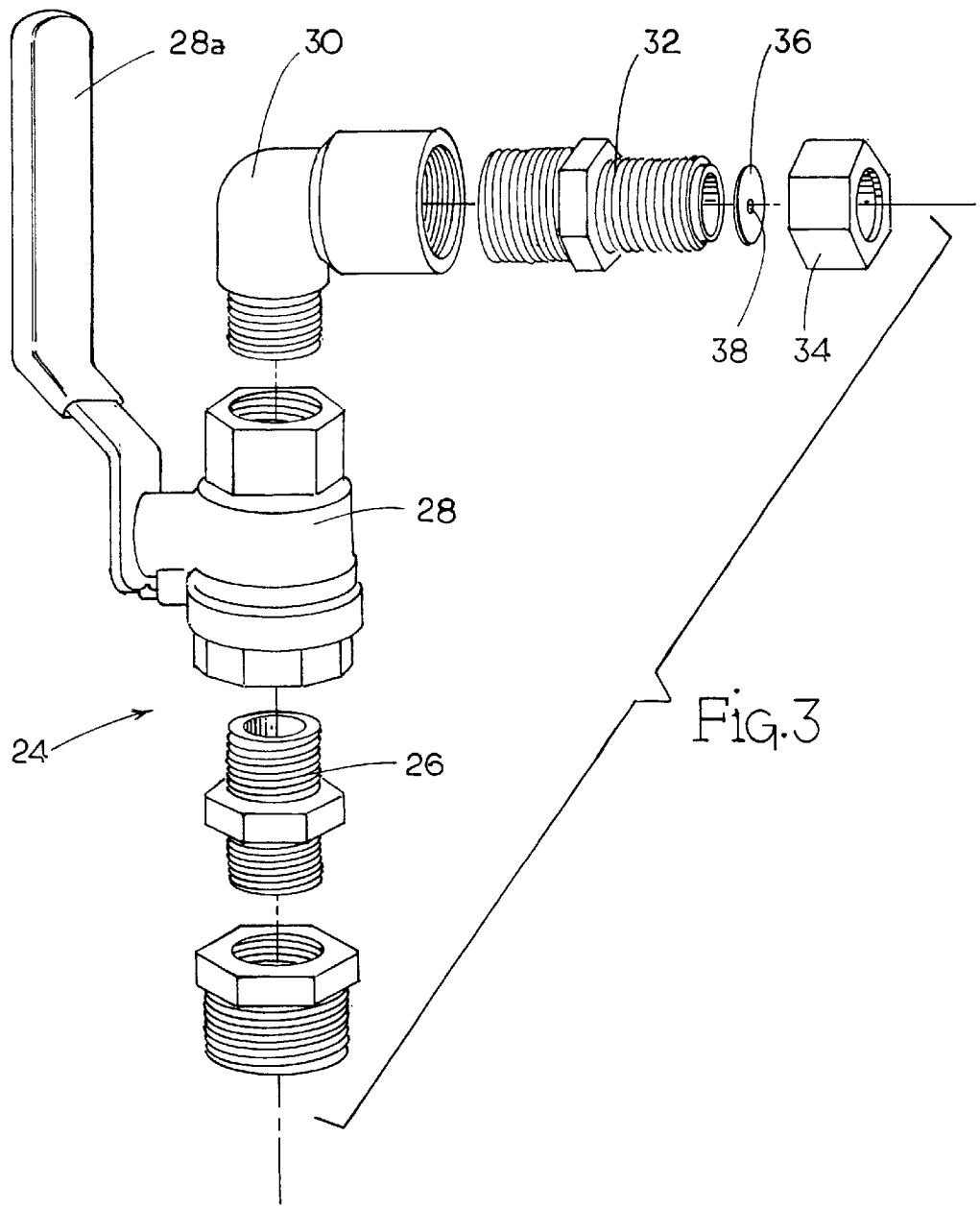

METHOD AND APPARATUS FOR APPLYING A GROWTH REGULATING COMPOSITION TO A COTTON CROP

This application is a continuation of U.S. Pat. application Ser. No. 08/772,480, filed Dec. 23, 1996, now U.S. Pat. No. 6,286,250.

FIELD OF THE INVENTION

The present invention relates to wick applicators and to applying growth regulating chemicals or compositions to agricultural crops, and more particularly to means for calibrating a wick applicator to control the application rate of chemicals therefrom and also more particularly to applying a growth regulating chemical to a cotton crop via a wick applicator.

BACKGROUND OF THE INVENTION

Wick applicators are often used to apply herbicides to weeds or other undesirable vegetation that typically grow among crops. Typically, a wick applicator includes an elongated tube that has an internal chamber for holding the herbicide. A series of dispensing holes are provided in the elongated tube and a wicking material or fabric is usually wrapped around the elongated tube adjacent the dispensing openings. It is known to provide a main on/off valve that is communicatively open to the internal chamber of the wick applicator. By opening the on/off valve, the wicking material wrapped around the elongated tube will, through a wicking action, draw the herbicide from the wick applicator. Once the wicking material has become wet with the herbicide, then the wick applicator can be used to directly engage and directly apply the herbicide to weeds and other undesirable vegetation. For a more complete understanding and appreciation of conventional wick applicators, reference is made to U.S. Pat. No. 4,884,362, the disclosure thereof being expressly incorporated herein by reference.

One of the major problems and drawbacks with all wick applicators is the inability to calibrate them and control the flow of liquid from the internal holding chamber to the outer wicking material. Experience with wick applicators reveals two extreme situations. First, there is the case where the flow rate of chemical is so low that the field operation is totally ineffective or is at best, marginally effective. Obviously, if an insufficient amount of the chemical is reaching the targeted foliage, then clearly the field operation is not satisfactory. Equally a problem is the situation where one finds the wicking material to be overly saturated. It is not uncommon to find operations where the wicking material is so saturated that the chemical is actually dripping from the wicking material. Not only is the wasteful but this problem can and will lead to serious crop damage. Moreover, the waste is even accelerated by the evaporative effects caused by the wick applicator being moved through the field at an appreciable rate.

Therefore, there has been and there continues to be a need for a wick applicator that includes some reliable means to calibrate the wick applicator and to in the end control the application rate of the applicator.

Turning briefly to a discussion of cotton and the application of growth regulating chemicals to cotton plants and their foliage, it is appreciated that it has for some time been standard practice in cotton farming to treat the growing cotton plants with a growth regulating chemical. To date, it appears that this operation is generally carried out by a conventional spraying procedure.

Before discussing the shortcomings of spraying a growth regulating chemical on cotton, it might be beneficial to basically review some of the reasons for applying such a chemical to cotton. Generally, plant growth regulators modify cotton plants in a number of beneficial ways. Applying growth regulators to cotton plants allow the cotton grower to manage the cotton crop for short season production and reduces the risk of poor quality and yield due to the harvest season being delayed or prolonged for reasons not controlled by the cotton grower. The application of growth regulators to cotton will reduce the height of certain cotton plants and will provide a more open canopy. At the same time, boll retention will be improved and in fact, the plant will grow larger bolls with less boll rot and improved defoliation. In the end, this will reduce trash in the cotton crop and will lower ginning costs. Therefore, it can be said that the cultural practice of applying growth regulators to cotton is well-known and is an accepted practice throughout the United States and indeed the world.

As pointed out above, plant growth regulators are generally applied to cotton by spraying. Sprayers used for this cultural practice are most often multi-row sprayers that take the form of a self-propelled overhead sprayer or a sprayer of the type that is mounted on a farm tractor. There are a number of serious problems with spraying cotton with a growth regulator. The most visible drawback and problem concerns how the operator chooses which plants to spray and which plants not to spray. It is an unusual occurrence, especially with respect to a first field operation, where all of the plants are the same size and the cotton grower desires to apply the plant growth regulator uniformly across a field. The typical situation is where a certain percentage of the cotton plants are taller than others and it is the desire and intent of the grower to only apply the growth regulating composition to these random occurring taller plants. Thus, it is customary to find the operator traveling through the field and periodically cutting the sprayer on and off. Obviously, this is a very imprecise way of applying the growth regulating composition to the intended plants. It is at best guess work, and it is especially so in view of the fact that the spraying system usually covers a large number of rows and a relatively large area in a small time sequence. Thus, the operator can only hope to minimize the inefficiencies and make the best of a bad situation.

Therefore, there has and continues to be a need for an effective way of applying a growth regulating chemical or composition directly to targeted cotton plants.

SUMMARY AND OBJECTS OF THE INVENTION

The present invention presents a wick applicator that overcomes the disadvantages and drawbacks of conventional wick applicators and at the same time provides a new method or process for directly applying a growth regulating chemical to targeted cotton plants that are of a height and maturity that call for such a direct application.

First, with respect to the wick applicator of the present invention, the same includes a liquid or chemical holder for holding the chemical to be dispenses, and at least one outlet opening formed in the liquid holder. A wicking material is disposed about the liquid holder and extends over and adjacent the outlet opening. Through a wicking action, chemicals held within the liquid holder are induced therefrom into the outer disposed wicking material. To calibrate the wick applicator or to control the flow rate of chemicals from the liquid holder into the wicking material, the wick applicator is provided with an air inlet that is communicatively open to the interior of the liquid holder. Disposed within the air inlet is a non-variable constant size orifice that is designed to control the flow of air into the internal area of the liquid holder which as a consequence, controls the rate that the chemical within the holder can be wicked therefrom. In the end, this will control the final application rate of the chemical to the targeted vegetation or foliage.

With respect to a process or method for treating a cotton crop with a growth regulating composition, the present invention contemplates a direct and targeted application through the use of a wick applicator. That is, the growth regulating composition is placed into a wick applicator. In applying the growth regulating composition, the applicator is set at a preselected height on a carrier frame or with respect to the ground. This preselected height is calculated to engage those cotton plants that are deemed appropriate for treatment. Thus, as the wick applicator is moved through the cotton field, it will engage and mop only that portion of the cotton crop that extends above a threshold or set level. As the wick applicator passes over the cotton crop, it is appreciated that because the wicking material will include the growth regulating composition that this growth regulating composition will be mopped onto the selected cotton crop.

It is therefore an object of the present invention to provide a wick applicator that includes means for regulating or controlling the application rate of the solution contained within the applicator.

Another object of the present invention is to provide a wick applicator that can be altered to provide different chemical application rates.

Still a further object of the present invention resides in the provision of a wick applicator of the character referred to above that includes an orifice that acts to regulate the application of chemicals from the applicator to foliage directly engaged by the wick applicator.

Another object of the present invention is to provide a method or process of treating cotton plants with a growth regulating composition wherein the growth regulating composition is applied directly to selected cotton plant foliage.

Still a further object of the present invention is to provide a method of treating cotton plants with a growth regulating composition wherein the growth regulating composition is applied directly to selected foliage via a wick applicator.

Other objects and advantages of the present invention become apparent and obvious from a study of the following description and the accompanying drawings which are illustrative of such invention.

BRIEF DESCRIPTION OF THE DRAWINGS

FIG. 1 is a side elevational view of the wick applicator of the present invention.

FIG. 2 is a cross-sectional view of the wick applicator taken along the line 2—2 of FIG. 1.

FIG. 3 is an exploded perspective view that illustrates the air inlet line of the wick applicator.

FIG. 4 is a schematic side view illustrating how the wick applicator is utilized to apply a plant growth regulator to a cotton crop.

DETAILED DESCRIPTION OF THE INVENTION

With further reference to the drawings, the wick applicator of the present invention is shown therein and indicated generally by the numeral 10. Wick applicator 10 comprises an elongated tube 12 that is constructed of PVC piping or other suitable material. Tube 12 can be of various sizes but is contemplated for general applications that a three-inch diameter PVC pipe would be appropriate. Formed within the tube 12 is a liquid holding chamber **12*a* (FIG. 2). As will be appreciated from subsequent portions of this disclosure, holding chamber 12*a* is adapted to receive and hold a liquid chemical to be applied by the wick applicator 10**.

Formed on the ends of the wick applicator 10 is a pair of clear end caps 14. The end caps 14 are clear so as to enable the operator to view the internal chamber **12*a*** and determine the quantity of liquid contained therein at any time.

Formed along the bottom portion of the tube 12 is a series of outlet openings 16. Note that in FIG. 2 where the outlet openings 16 are directed out the lower side of the tube 12, approximately between the five and six o'clock position as viewed in FIG. 2. Note also that in the embodiment illustrated herein, that there are two sets of the outlet openings 16. Each set of openings is designed, in the case of this disclosure, to accommodate a single row of a particular row crop. Thus, as viewed in FIG. 1, since there are two sets of outlet openings 16, the wick applicator 10 illustrated therein is adapted and designed to accommodate the simultaneous treatment of two rows of crop. Outlet openings 16 can vary in size and in spacing between the respective openings It is contemplated that for general applications that the outlet openings 16 would be approximately ⅛ to ⅜ inch in diameter and would be spaced approximately 1½ to 2 inches apart.

Secured around the elongated tube 12 adjacent the respected sets of outlet openings 16 is a wicking material 18. Note that the wicking material 18 is wrapped and secured around the tube 12 in such a fashion that the wicking material covers and extends around the area of the tube occupied by the outlet openings 16. Various wicking materials are known and are conventionally used on wick applicators. In the case of the present disclosure, it is contemplated that a relatively heavy denim fabric, of the upholstery type, would be suitable for a direct crop wick application as discussed subsequently in this disclosure. As illustrated in FIG. 2, the wicking material 18 disclosed herein is of a 2-ply construction. Because the wick applicator 10 disclosed herein is designed for a row crop application, the width of the wicking material 18 on the tube 12 should be of a sufficient span to effectively treat a single row. While the span of the wicking material 18 can vary to accommodate certain conditions -and row spacings, it is contemplated that a span of 20 to 22 inches would be suitable in general applications.

With reference to FIG. 1, it is seen that there is a T-coupler 20 secured to one end of the elongated tube 12. T-coupler 20 includes a threaded opening formed in what is referred to as the top of the coupler 20 or the top of the wick applicator 10. Secured within the threaded opening of the T-coupler 20 is a threaded cap 22. Threaded cap 22 also includes a smaller threaded -opening therein.

Secured within the smaller threaded opening of the cap 22 and extending therefrom is an air inlet line indicated generally by the numeral 24. Air inlet line 24 includes a threaded coupler 26 that is adapted to be threadly connected within the opening formed in the cap 22. Secured to the threaded coupler 26 is a main on/off valve 28. Main on/off valve 28 includes a actuating handle 28a that can be turned or rotated to open and dose-the main on/off valve 28.

Secured to the main on/off valve 28 and extending therefrom is an elbow 30. Connected to the elbow 30 is a reducer 32 that includes a threaded end 32a. An orifice plate retainer 34 that includes internal threads is designed to be secured to the threaded end 32a of the reducer 32. Orifice plate retainer 34 is designed to accept and hold an orifice plate 36. In particular, orifice plate 36 is sized to fit within the retainer 34 and the retainer 34 is in turn adapted to hold and secure the orifice plate 36 between the terminal end of the threaded end 32a of the reducer 32 and the retainer 34. Formed in the orifice plate 36 is a non-variable fixed size orifice 38.

The orifice diameter can vary depending upon the type of application that the wick applicator is set up to accommodate. Generally however, it is contemplated that in most field applications that the orifice diameter would range in size from approximately 0.020 to 0.150 inches in diameter. More particularly, one is referred to the various orifice plates manufactured by spraying Systems Co., of Wheaton, Ill. Spraying Systems Co., manufactures an orifice plate, No. 49/6-35 that is appropriate in a number of typical agricultural crop applications.

The purpose of the orifice 38 is to control the rate of application of the wick applicator 10. Essentially, the orifice 38 is sized so as to calibrate the rate of fluid dispersion from the holding chamber 12a into the wicking material 18. While the wicking material 18 tends to draw the liquid from the chamber 12a, the presence of air passing through the orifice 38 during this process establishes, in part at least, the flow rate of liquid through the outlet openings 16 into the wicking material 18. Consequently, the size of the orifice 38 formed in the orifice plate 36 controls the rate the liquid chemical held within the chamber 12 is wicked into the wicking material 18 and applied to crop material or other foliage.

As discussed in the Background Of The Invention, cotton plants tend to grow at different rates. As a consequence, during the growing season it is typical in a crop of cotton to find uneven growth. That is, under normal growing conditions some of the cotton plants will be higher than others. This is undesirable. For reasons already discussed, it is desirable for the cotton plants be of a uniform maturity as they approach harvest season.

In the past, cotton crops have been sprayed with a growth regulating composition such as Pix Concentrate Plant Regulator manufactured by BASF Corporation of Research Triangle Park, N.C. 27709-3528. The active ingredient in many plant growth regulators, including the Pix Concentrate Growth Regulator, is Mepiquat Chloride. The drawbacks and problems of spraying a growth regulating product on cotton has already been addressed. In short, spraying is a most ineffective and inefficient means of applying a growth regulating composition to a non-uniform cotton crop.

The present invention contemplates applying such a growth regulating composition directly to select and targeted cotton plants by utilizing the wick applicator 10 to actually engage certain cotton plants and to effectively mop a growth regulating composition onto certain plants. With reference to the schematic of FIG. 4, a tractor 100 is shown therein and includes a three-point hitch arrangement 102 that supports a tool bar 104. Tool bar 104 can be raised and lowered via the tractor's hydraulic system. Secured to the tool bar 104 is a horizontal frame 106 that extends rearwardly therefrom. Supporting horizontal frame 106 is a pair of ground engaging wheels 108. Secured about the rear of the horizontal frame 106 is a sub-frame or carrier frame 110. The carrier frame 110 is vertically adjustable within the horizontal frame 106. In fact, the carrier frame 110 can be moved up and down with respect to the horizontal frame 106 and stationed at any number of vertical positions. Forming a part of the carrier frame 110 is a transversely extending lower connecting bar 112. The lower connecting bar 112 serves to support and hold the wick applicator 10 thereunder. A series of laterally spaced strap-type clamps, such as hose clamps, can be utilized to secure the wick applicator 10 to the underside of the lower connecting bar 112.

Figure 4:
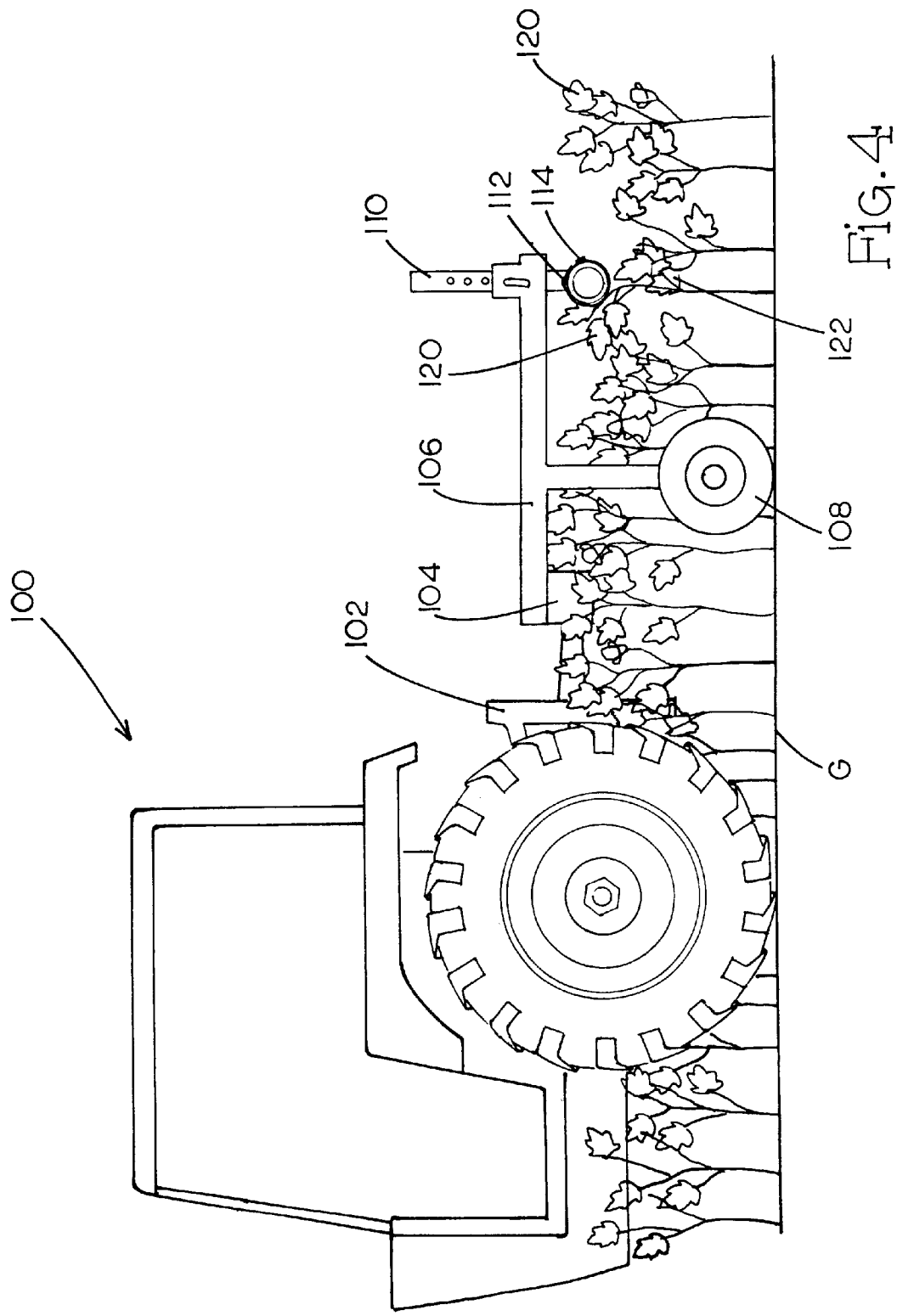

The wick applicator 10 shown in FIG. 4 is designed to treat two rows of cotton as there is provided two sets of holes 16 with the wicking material 18 wrapped around each set of holes 16. To carry out the process, the cotton grower or operator selects an elevation for the wick applicator 10. Typically, the cotton grower will select the elevation such that as the tractor is propelled through the field, the wick applicator 10 will engage and treat a certain population of cotton plants that extend upwardly to a height comparable to the elevation set for the wick applicator 10. Thus, as the tractor 100 moves through the field with the wick applicator 10 set at a particular relative to the ground G, the wicking material 18 aligned with each row will engage the higher cotton plants and the growth regulating composition wicked into the wicking material 18 will be mopped onto the foliage of these plants. This is particularly illustrated in FIG. 4. Note that the top portion of the higher cotton plant 120 is being engaged and mopped by the wick applicator. Also note that the lower cotton plants 122 have upper extremities that lie below the treating elevation selected for the wick applicator 10. Consequently, as the tractor 100 moves through the field, cotton plants 122 and other plants that are no higher will not be treated.

Cotton growers may utilize various treating schemes including one or more treatment phases during the growing season. In the way of an example, it is contemplated that the wick applicator 10 of the present invention will be utilized in a first phase treatment program that will occur when the cotton plants reach a height of approximately 14 to 24 inches. This is often referred to as "pin head square". These cotton plants are just beginning to show the growth of bolls and this occurs generally about 6 to 10 weeks after field planting. During this first phase of treatment the object is to selective engage and target that population of the cotton crop that extends above a certain threshold. Here, as outlined above, the wick applicator 10 moves over the cotton field at a generally constant elevation with respect to the tractor and the ground. Larger cotton plants are engaged and treated directly while smaller cotton plants are passed over by the wick applicator 10.

Continuing with the example, after the first phase treatment, there can be a second phase treatment where the cotton grower treats substantially all of the cotton. This would typically take place approximately 10 to 21 days after the first treatment. Again, smaller cotton plants can be passed over but generally it is contemplated that a greater percentage of the cotton plants will be contacted and treated during the second phase compared to the first phase.

Application rates can vary but it is contemplated that for typical applications one would expect an application rate of approximately 1 to 2 ounces per acre of the plant growth regulator, such as the Pix Concentrate Growth Regulator. Generally, the plant growth regulator is diluted in a solution. In a diluted solution form, a typical application entails applying approximately 8 to 12 ounces of diluted solution containing the plant growth regulator per acre of cotton. To apply the growth regulating composition at the rate described above, the grower can select an orifice 38 of a proper size to yield such an application rate when the applicator is moved through the field at a conventional rate of 4 to 6 miles per hour.

To fill the wick applicator 10 of the present invention, cap 22 can be removed from the T-coupler 20 and the chemical to be utilized, can be poured into the opening formed in the T-coupler 20. During periods of non-use, the main on/off valve 28 can be shut off and the tube 12 rotated to where the outlet openings 16 are disposed about a top portion of the tube. This will prevent solution from wicking from the internal chamber 12a outwardly to the wicking material 18.

It will be appreciated that the wick applicator 10 can be used to apply other solutions and compositions directly to field crops. For example, nutrients such as Boron and other fertilizers can be directly applied to plant foliage.

From the foregoing specification and discussion, it is seen that the wick applicator 10 of the present invention has the advantage of providing a calibrated wick applicator. In other words, the utilization of the orifice within the air inlet line permits the flow of air into the wick applicator to be precisely controlled. Moreover, different application rates can be achieved by simply varying the orifice plate and the size of the orifice formed therein.

Also, the present invention provides a new method or process for targeting select cotton plants for the purpose of applying a growth regulating composition to the foliage thereof. In the process disclosed herein, a wick applicator is set at a selected elevation with respect to ground level such that the wick applicator will engage only the top portions of cotton plants selected for treatment.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An agricultural wick applicator for applying liquid chemicals to crops, weeds and other vegetation comprising: a liquid holder for holding a liquid chemical; at least one outlet opening formed in the liquid holder; a wicking material disposed adjacent the outlet opening for wicking the liquid chemical from the liquid holder; and a metering orifice communicatively coupled to the liquid holder for generally controlling the rate of flow of the liquid chemical from the liquid holder to the wicking material, the metering orifice including a plate having a non-variable, constant size orifice formed therein for controlling the flow of air into the liquid holder and thereby controlling the flow rate of the liquid chemical flowing from the liquid holder to the wicking material.

2. The wick applicator of claim 1 wherein the wick applicator includes an air inlet having the plate and orifice secured therein.

3. The wick applicator of claim 1 wherein the orifice plate is removable such that replacement orifice plates with different size orifices may be incorporated to yield different chemical application rates.

4. The wick applicator of claim 1 including an air inlet line communicatively connected to the liquid holder and having a threaded orifice plate retainer normally secured to the air inlet line for retaining the orifice plate in the air inlet line.

5. The wick applicator of claim 4 including a main on/off valve disposed within the air inlet line.

6. The wick applicator of claim 1 wherein the wicking material includes a denim fabric.

7. The wick applicator of claim 1 wherein the non-variable constant size orifice has a diameter of approximately 0.020 to 0.100 inches.

* * * * *